March 29, 1932.  O. KREMMLING  1,851,945
APPARATUS FOR EXPRESSING BAKERS' MATERIAL
Filed April 22, 1929  5 Sheets-Sheet 1
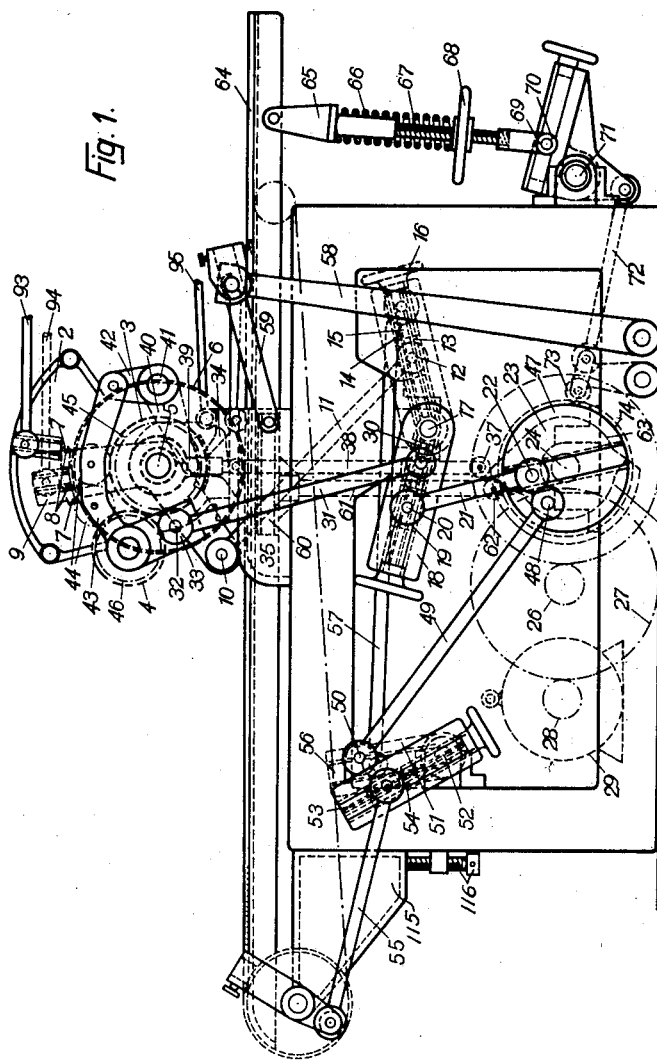
Inventor:
Otto Kremmling, March 29, 1932. O. KREMMLING 1,851,945
APPARATUS FOR EXPRESSING BAKERS' MATERIAL
Filed April 22, 1929 5 Sheets-Sheet 2

Inventor:
Otto Kremmling,
Att'y.

March 29, 1932. O. KREMMLING 1,851,945
APPARATUS FOR EXPRESSING BAKERS' MATERIAL
Filed April 22, 1929   5 Sheets-Sheet 3

INVENTOR.
OTTO KREMMLING,
BY
ATTORNEY.

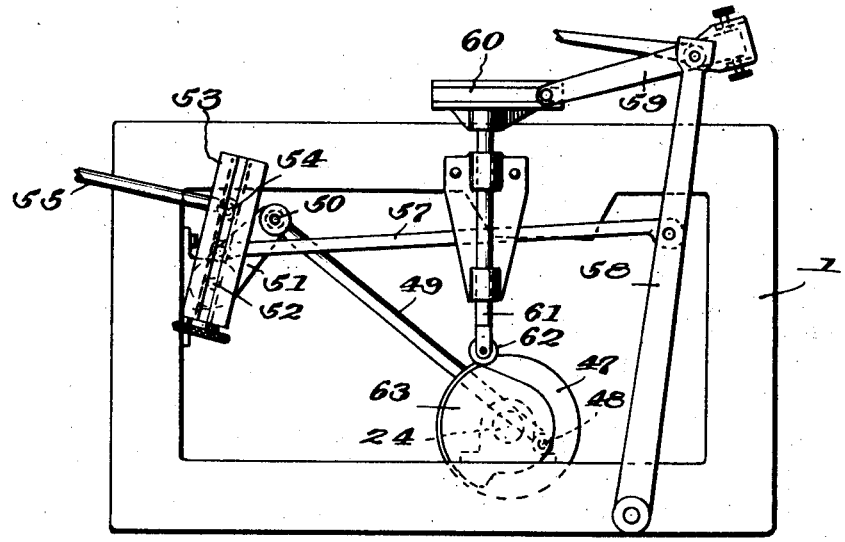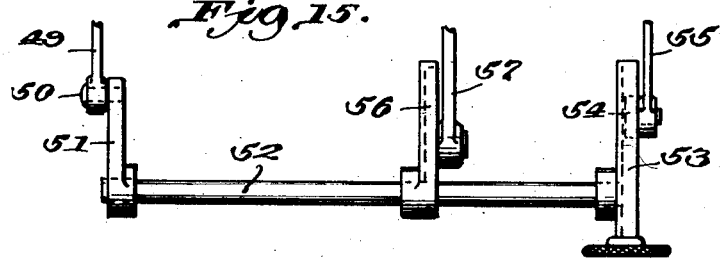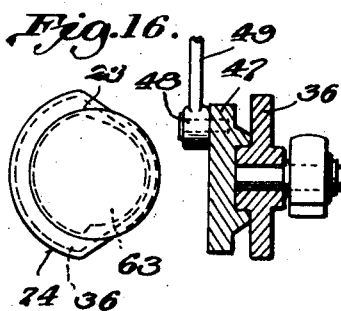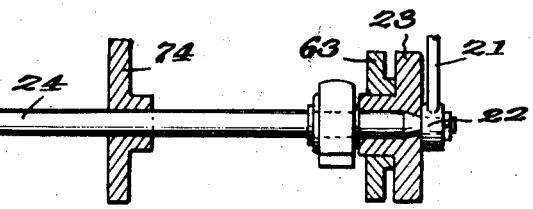

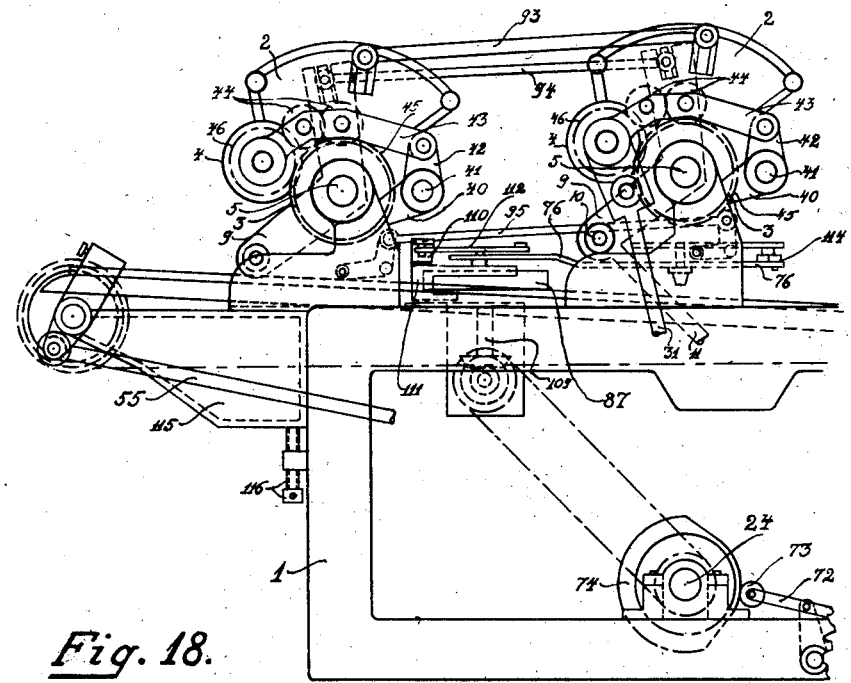

Patented Mar. 29, 1932

1,851,945

UNITED STATES PATENT OFFICE

OTTO KREMMLING, OF OSCHERSLEBEN, GERMANY

APPARATUS FOR EXPRESSING BAKERS' MATERIAL

Apparatus filed April 22, 1929, Serial No. 357,301, and in Germany June 16, 1926.

This invention relates to a process of and apparatus for expressing quantities of baker's material of the consistency for instance of icing, dough or pasty material. The invention consists in the material being conveyed from the material container by means of smooth rollers rotating in opposite directions into a relatively small discharge chamber, the rollers controlling communication between the chamber and the container. The material is then forced, substantially in the same direction of movement as at the introduction into the chamber, through the chamber to outlet openings from which it is expressed and at the same time shaped, so that the nature or quality of the materials to be treated is unfavourably affected to the least possible extent.

The invention is based on the discovery that the best method of supplying the material to be treated to the expression chamber is by means of feed rollers, as this ensures that the material passing into the chamber has a uniform density throughout the whole width of the chamber. This cannot be ensured by the use of other means for the transfer of the material from the container to the chamber, for instance, by the use of suction pistons or plungers.

In the hitherto known machines with feed rollers, the action of the rollers on the exceedingly soft material is so unfavourable that the nature or quality of the said material is injuriously affected. Thus for instance the material for biscuits becomes too tough for shaping, while frothy material becomes on the contrary, too sodden. In the case of materials rich in fat, a separation of the fat takes place, causing a great reduction of the quality of the finished pastry, as well as an unintended reduction of size of the single pieces of pastry. This is particularly true in hot seasons, but is also true at other times, for in the industries concerned high temperatures are generally used.

With the machine intended for carrying out the process according to this invention, soft, frothy, or similar materials such as sillabubs, sweets, pastry, biscuits, macaroons or chocolates may be made into small articles of a given size and of the most varied shapes.

The machine also substantially facilitates the introduction of the material into the expressing chamber, as the space which becomes free during the expressing is situated closely under the feed rollers, and the fresh material may be fed-in without friction owing to the rotation of the feed rollers. As soon as the space becomes free, the rotation of the rollers immediately begins, so that no hollow spaces are formed which are injurious to the manufacture of pieces of the same size.

Another advantage is that the rollers are arranged as close as possible to the outlet openings, and a very large part of the boundary surfaces of the expression chamber is formed by the circumferential surfaces of the rollers, and in that way the surfaces exerting friction on the material are considerably reduced.

Owing to the fixed mounting of the plate containing the outlet openings, this plate may also be given, for the purpose of shaping the material, any imaginable movement in the horizontal plane with a considerably greater facility than in other machines. This makes it possible to manufacture drop-shaped portions when the outlet openings (also called nozzles) are standing still during the shaping, and also portions which are shaped by the movement of the nozzles. For bringing about these movements cam discs are preferably used.

It is possible moreover that the portions of paste or dough may be made from different materials, for instance the so-called filled confectioner's work. This may be done by extruding an ornamentation or a second layer of a material of a different kind on semi-manufactured articles positioned by the table conveying devices under the expression nozzles, or by arranging behind one another several upper parts which put on materials of different kinds.

Owing to the arrangement of edge discs on one of the rollers, for instance on the fixed one, it has also become possible to feed-in the material in a uniform manner into the expression chamber for the purpose of obtaining pieces of the same size. This is further greatly facilitated by the roller pivotally mounted in the container, first rolling the material wide, during the pressing out movement, and then pushing it during the feeding-in movement into the feeding-in opening.

An advantage of the machine is also that the upper parts may be directly turned apart for the purpose of cleaning the expression chamber.

By way of example, two constructions of the machine according to the invention are diagrammatically illustrated in the accompanying drawings.

Figure 1 shows the machine in side elevation.

Figures 2 and 3 show the position of the container and of the expressing device at the beginning and at the end of the feeding-in.

Figure 4 shows the cam gear for the driving of the nozzles.

Figure 5 shows a cam disc with two guides.

Fig. 14 is a detailed side elevation of the cam shaft and of the actuating means for the cutting device.

Fig. 15 is a detailed top plan view of the shaft 52 and the members mounted thereon.

Fig. 16 is a side elevation of the cam shaft.

Fig. 17 is a detailed top plan view of the cam shaft.

Figure 18 is a side elevation view of the machine showing an arrangement employing two containers and also showing the driving connections to a disc provided with cam grooves on both sides as in Figure 5.

Figure 19 is a plan view of the disc shown in Figures 5 and 18 disclosing the connecting means for guiding the horizontal movement of the nozzle plate.

Figure 6:
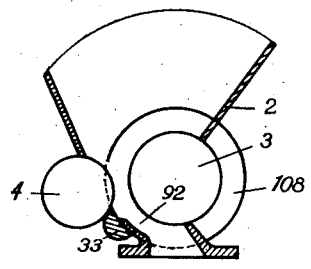
Figures 6 to 9 show the position of the rollers during the feeding-in and the expressing.

On the machine frame 1 is mounted the container 2 for the material to be treated. The container is closed at the bottom by two oppositely rotating, practically smooth, rollers 3, 4 which are adapted to rotate with the same circumferential speed under the action of spur wheels. The larger roller 3 is secured to a spindle 5 to which is further secured a ratchet wheel 6. The pawls 7 for the said ratchet wheel 6 are rotatable on pins 8 which are secured to a bell crank lever 9. The bell crank lever 9 is rotatable on the spindle 5 and connected by means of a pin 10 to a connecting rod 11 which engages by means of a pin 12 with a block 13.

The block 13 is adjustable in a guide 14 by means of a spindle 15 and of a hand wheel 16, in order to enable the extent of rotation of the rollers 3, 4 to be adjusted. The guide 14 is rigidly secured to a spindle 17 which is rigidly secured to a further guide 18. In the guide 18 travels a block 19 which is connected by a pin 20 to a connecting rod 21, the other end of which is driven by the pin 22 of the adjustable crank disc 23. The crank disc 23 is secured to the spindle 24 which is driven by means of a gearing 25, 26, 27, 28 by an electric motor 29.

In the guide 18 there is also another adjustable slide block 30 on which is mounted the connecting rod 31 which is connected with its other end to the pin 32 mounted in the pivoted container 2. The container 2 with the roller 4 mounted in the same, and with a piston part or scraper 33 rigidly mounted in the container is turned by means of the rod 31 about the spindle 5 of the roller 3, owing to which the material is expressed downwards from the intermediate part 34. The roller 4 is mounted in the ends of two links 132 pivoted on the pin 32. The scraper 33 is pushed at the same time behind a tongue 35 of the intermediate part 34, so that the expression chamber is pushed together, and the material pressed out.

On the spindle 24 is mounted a cam disc 36 on which travels a roller 37 of a pressure rod 38. The pressure rod 38 engages with its other end formed into a guide track, under a pin 39 of a lever 40 which is secured to a spindle 41. On the spindle 41 are mounted levers 42 which are connected to a bridge 43 in which are mounted gear wheels 44 which effect the connection between the gear wheels 45 and 46 of the rollers 3 and 4. Owing to the movement of the parts 36 to 46, the roller 4 is lifted off from the roller 3 or again pressed against the same.

On the spindle 24 is further mounted an adjustable crank disc 47 to the pin 48 of which is secured a connecting rod 49, the other end of which engages with the pin 50 of a lever 51 which is rotatable on the spindle 52. In the rotatable or rocking lever 51 is provided a guide 53 in which slides a block 54 which is connected to the connecting rod 55 which by means of its other end operates a conveying device (chain or the like) for the sheet metal plates carrying the portions expressed. On the spindle 52 is mounted with a guide a further lever 56 which moves the connecting rod 57 which engages with cutting arms 58, the cutting device of which is guided by an arm 59 in a guide 60. This guide is vertically reciprocated by a rod 61 with a roller 62 and a cam disc 63.

For raising and lowering table 64 a cross piece 65, a spring 66, a pin 67, a hand wheel 68, a connecting pin 69 and a guide block 70 are used. These parts are connected by a pin 71 and a connecting rod 72 to a pressure roller 73 and are moved by a cam disc 74. Means are also provided for adjusting the height of the other end of the table. In Figures 1 and 18 the portion 115 is raised or lowered by turning the screw 116. As the left end of the conveyor is mounted on the portion 115 it is also raised or lowered by the screw 116.

In Figure 2, the upper part of the machine is shown separately. Under the intermediate part 34 is arranged an insertion piece 75 under which is provided an adjustable nozzle plate 76 which is held and guided by the guides 77. In the nozzle plate 76 are arranged interchangeable nozzles or pipes 78 which are intended for the dressing portions as they are pressed out. The nozzle plate is driven in one direction for instance by means of three cam discs 79, 80, 81 arranged side by side, through the bell crank levers 82, 83 and connecting rod 84. The cam disc 80 moves the nozzle plate 76 by means of a double armed lever 85 and of a connecting rod 86 in a direction at right angles to the first one. Owing to the co-operation of these two movements, the nozzle plate makes any desired movement according to the construction of the cam discs.

It is not absolutely essential that the nozzle plate should be driven by three cam discs. It is possible to use for instance only two cam discs, one of which brings about one part of the movement in one direction, whilst the other cam disc controls the movement at right angles to it. In such a case, it is necessary to make the nozzle plate 76 with a parallel guide so as to prevent it from turning. But it is also possible to use one single cam disc 87 with two or more guides 88 (Figure 5). In Figures 18 and 19 the use of a single cam disc 87 is shown. The disc is mounted horizontally on the vertical shaft 109 rotatably mounted adjacent the frame 1, the shaft 109 is driven from the shaft 24 by any suitable connections such as by the belt and pulley arrangement shown in Figure 18.

The connecting means between the cam disc 87 and the plate 76 are clearly shown in Figure 19. The cam grooves 88 in each side of the disc 87 are engaged by elements on the arms 110 and 111. These arms respectively connect with rods 112 and 113 connected to the plate 76. The plate 76 is thus moved in a horizontal plane in all directions. The movement of the plate is directed by the particular path of the cam grooves. The double armed arrangement indicated at 114 is to insure that any movement as the result of movement of the rod 112 will also be communicated to the other end of the plate 76.

For the purpose of correctly feeding-in the material and of proper covering of the drawing-in point of the feed rollers for protecting the attendants, there is provided in the container a roller 89 which is rotatably mounted in the ends of two arms 90, the other ends of the arms being pivoted at fixed points. The roller thus does not move with the container but rests by its own weight on the material being fed to the rollers. This roller does not participate in the oscillating movements of the upper part, but at each pressing out oscillation movement rolls the material in the container widely to the shape of a cake. As soon however as the container is turned to the other side for the purpose of feeding-in, this roller pushes the material into the inlet openings of the feed rollers. The direction of rotation of this roller is controlled by a spring wheel device 91 consisting of a ratchet integral with the roller and a pawl spring pressed into engagement with the ratchet. By this structure the roller may turn in only one direction.

Figure 7:
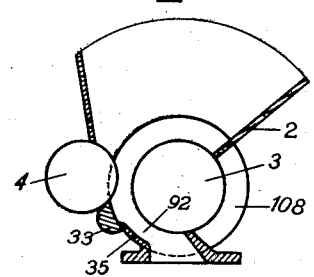
Figure 8:
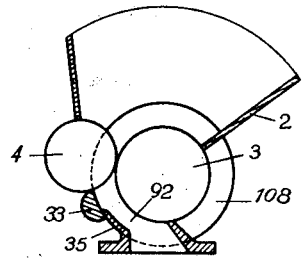

The working of the machine is as follows:

When the roller 4 is in its lowest position and lifted off or disengaged from the roller 3 (Figure 6) the hopper with the roller 3 is turned upwards, so that the material is conveyed by the feed rollers 3, 4 into the expression chamber 92. As soon as the roller 4 reaches its highest position, the chamber 92 is filled (Figure 7). The roller 4 is then moved by the movement of the parts 36 to 46 against the roller 3 (Figure 8).

Figure 9:
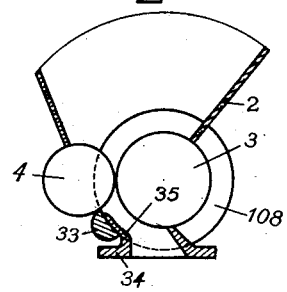
Figure 10:
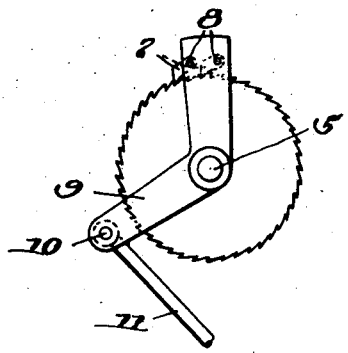
Fig. 10 is a detailed side elevation of the pawl and ratchet drive for the rollers.
Figure 11:
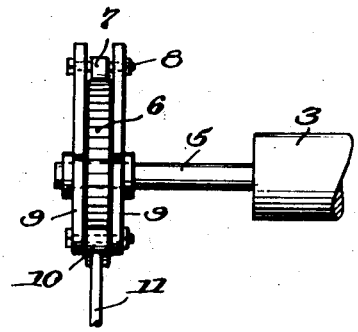
Fig. 11 is an end view of the same.
Figure 12:
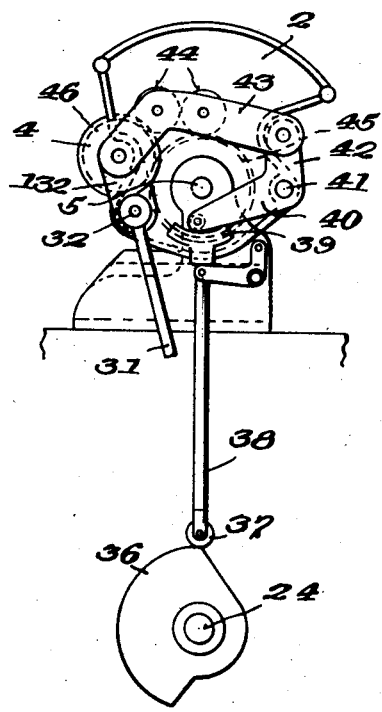
Fig. 12 is a detailed side elevation of the mounting and the actuating means of the second roller.
Figure 13:
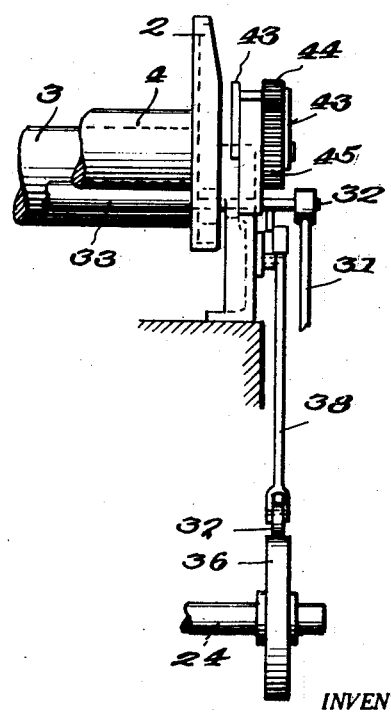
Fig. 13 is an end view of the same.

The pressing out now begins, the container 2 with the roller 4 and its driving parts being turned down about the roller 3 by the connecting rod 31, pin 32 and scraper 33, the scraper 33 being moved behind the tongue 35 of the intermediate part 34 (Figure 9). Owing to this pushing together, the material will be expressed through the nozzles 78 out of the chamber 92, and either cut off by the cutting device 58, 59 and placed on sheet metal or other plates or it will be dressed on the plates, the table 64 with the parts 65 to 74 used for the lifting of the table being brought approximately to the nozzles, and in that way the expressed portion is dressed on the plates which the conveying device continues to move by means of the driving parts 54, 55.

In the lower expressing position, the roller 4 is lifted off from the roller 3, so that the position according to Figure 6 is reached again. The same operation begins then afresh.

The rollers need not be brought together so far that the material is completely divided and cut through. On the contrary, the degree of bringing together of the rollers may be chosen differently to suit the nature of the material treated, provided only that the flowing of the material back into the container is avoided. In the case for instance of living yeast dough which, as is well known has a rubber-like extensibility, it is sufficient to bring the rollers together only approximately. The band of dough is not separated thereby, so that the subsequent feeding-in is facilitated.

According as large or small portions are to be expressed the rough adjustment of the parts is effected by means of the adjustable crank discs. The fine adjustment is on the contrary effected during the working by means of the guides 14, 18 and 54, as well as of the adjustable blocks for the connecting rods, sliding in the said guides.

For the manufacture of portions from two or more different materials, two or more upper parts may be arranged behind one another, the movement of which is derived from the first upper part by means of the connecting rods 93, 94, 95 as shown in Fig. 18.

In order to rub smooth the cut off part it has been found advantageous at the end of the expressing and dressing, to bring the nozzle plate rapidly back again in exactly the same direction in which it travelled. The plate may however also continue to move, according as it may be required for the appearance of the work pieces. This may be easily regulated by the construction of the cam discs.

In order to obtain a drop-like closing place of the portions during the expressing and dressing, the table may also be pressed for an instant against the nozzles and lowered again, at the beginning and at the end of the dressing.

In order to enable larger portions to be manufactured without the same more or less losing their shape during the cutting off, bridges may be provided in the expressing opening. The material therefore comes cut in single bands which during the cutting off by means of the cutting wire, are pushed together to a coherent body, the total shape of the body, if desired with openings and recesses in the interior of the body, being preserved.

The process may also be carried out by means of a machine in which one pivoted roller is placed, before the beginning of the expressing, against a fixed roller, and by the lifting of the table the parts of the expression chamber are pushed together in such a way that their space becomes smaller, and the required quantity of material is expressed.

What I claim is:

1. Apparatus for forming objects of baker's material comprising a pivotally mounted container, a pair of rollers arranged in the lower portion of said container to form a chamber therebeneath, one of said rollers being rotatably mounted in the container, the other roller being oscillatably mounted in said container and thereby adapted to swing vertically with the container and to move towards and from said first roller, the chamber having openings in the bottom thereof, means for moving said second roller towards said first roller and for then swinging said container and second roller around said first roller to feed material to said chamber, then to isolate said chamber from the remainder of the container, then to express material through said openings.

2. Apparatus for forming objects of baker's material comprising a pivotally mounted container, a pair of rollers arranged in the lower portion of said container to form a chamber therebeneath, one of said rollers being rotatably mounted in the container, the other said roller being oscillatably mounted in said container and thereby adapted to move towards and from said first roller and to swing vertically with the container, said chamber having openings in the bottom thereof, and means for moving said second roller towards said first roller and for then swinging said container and second roller around said first roller to first feed material to said chamber, then isolate said chamber from the remainder of the container, and then express the material in the chamber through said openings, and means for shaping the material as it is expressed.

3. Apparatus for forming articles of baker's material comprising a pivotally mounted container, a pair of rollers arranged in the lower portion of said container to form a chamber therebeneath, one of said rollers being rotatably mounted in the container, the other roller being oscillatably mounted in the container for movement towards and from said first roller and for substantially vertical movement with said container, said chamber having openings in the bottom thereof, and means for moving said second roller toward said first roller and for then swinging said container and second roller downward around said first roller to press out material from said chamber.

4. Apparatus for forming articles of baker's material comprising a pivotally mounted container, a pair of rollers arranged in the lower portion of said container, one of said rollers being rotatably mounted in said container, a pair of pivoted arms mounted on said container, said second roller being rotatably mounted in said pivoted arms, said chamber having openings in the lower part thereof, and means for moving said second roller toward said first roller and then downward with the container around said first roller.

5. Apparatus for forming articles of baker's material comprising a pivotally mounted container, a pair of rollers arranged in the lower portion of said container to form a chamber therebeneath, one of said rollers being rotatably mounted on the same axis as said container, a pair of arms pivotally mounted on said container, said second roller being rotatably mounted in said arms, a link connected to said arms adapted to move horizontally to move said second roller towards and from said first roller, said chamber having openings in the bottom thereof.

6. Apparatus for forming articles of baker's material comprising a pivotally mounted container, a pair of rollers arranged in the lower portion of said container to form a chamber therebeneath, one of said rollers being rotatably mounted in said container, the other of said rollers being adapted to move towards and from said first roller and to oscillate with said container, and a scraper mounted on said pivoted portion of the container and adapted to contact with said second roller and to engage slidably with the outer face of the wall of said chamber.

7. Apparatus for forming articles of baker's material comprising a pivotally mounted container, a pair of rollers arranged in the lower portion of said container to form a chamber therebeneath, one of said rollers being rotatably mounted in said container, a scraper on the pivoted portion of said container, a pair of arms pivoted on the ends of said scraper, said second roller being rotatably mounted in said arms, a link connected to said arms and adapted to be moved horizontally to move said second roller towards and from said first roller, said scraper contacting said second roller and slidably engaging the outer face of the wall of said chamber, said chamber having openings in the bottom thereof.

8. Apparatus for forming articles of baker's material comprising a container, a pair of rollers arranged in the lower portion of said container to form a chamber therebeneath, one of said rollers being rotatably mounted in the container, the other roller being adapted to be moved towards and from said first roller and vertically, link means for moving said second roller and gearing between said rollers mounted on said link means and adapted to move with said second roller and to constantly engage said first roller so as to preserve a driving connection between said rollers, said container having openings in the bottom thereof.

9. Apparatus for forming articles of baker's material comprising a pivotally mounted container, a pair of rollers arranged in the lower portion of said container to form a chamber therebeneath, one of said rollers being rotatably mounted on the same axis as said container, a pair of arms pivoted on the pivoted container, the second roller being rotatably mounted in said arms, a link connected to said arms and adapted to be moved horizontally to move said second roller towards and from said first roller, and gearing between said rollers mounted on said link and adapted to maintain a driving connection between said rollers, said chamber having openings in the bottom thereof.

10. Apparatus for forming articles of baker's material comprising a container, a pair of rollers arranged in the lower portion of said container to form a chamber therebeneath, means for operating said rollers to isolate said chamber from the remainder of the container and to express material from said chamber, and a third roller oscillatably mounted above said first and second rollers and independent of said roller operating means and adapted to flatten material passing between said first and second rollers.

11. Apparatus as claimed in claim 10, and means to prevent the rotation of said third roller in one direction.

12. Apparatus as claimed in claim 10, and a pawl and ratchet adapted to prevent rotation of said third roller in one direction during oscillation.

13. Apparatus for forming objects of baker's material comprising a pivotally mounted container, a pair of rollers arranged in the lower portion of said container to form a chamber therebeneath, one of said rollers being rotatably mounted in the container, the other roller being oscillatably mounted in the container and thereby adapted to swing vertically with the container and to move towards and from said first roller, means for moving said rollers to feed material to said chamber, to isolate said chamber from the remainder of the container, and to express material from said chamber, said chamber having openings in the bottom thereof, and means for moving said openings horizontally for shaping the material.

14. Apparatus as claimed in claim 13, said last mentioned means comprising elements having cam grooves therein and members engaging in the grooves and connected to said openings.

15. Apparatus as claimed in claim 13, said last mentioned means comprising a single cam disc having a plurality of curved guides thereon and members engaging said guides and connected to said openings.

16. Apparatus as claimed in claim 13, said last mentioned means also including means for moving said openings backward when the shaping movement is completed.

17. Apparatus as claimed in claim 1, and a second container similar in construction to said first container and arranged adjacent thereto, a conveying device passing between both said containers, whereby articles of two materials may be formed, and means connected to said first container for actuating said second container.

18. Apparatus for forming articles of baker's material, comprising a nozzle, means for extruding material through said nozzle, an endless conveyor passing beneath said nozzle, means for adjusting the height of either end of said conveyor, means for moving said conveyor upward against said nozzle, and means for moving said conveyor suddenly away from said nozzle.

19. Apparatus for forming articles of baker's material, comprising a nozzle, means for extruding material through said nozzle, an endless conveyor passing beneath said nozzle, a second nozzle in front of said first nozzle and above said endless conveyor, means for extruding material from said second nozzle, means for adjusting the height of either end of said conveyor, means for moving said conveyor upward against said nozzles, and means for moving said conveyor suddenly away from said nozzles.

20. Apparatus for forming articles of baker's material, comprising two containers, means connected to one of the containers for actuating the other container, a conveyor passing beneath both said containers, means for expressing material from said containers, means for raising one end of said conveyor, and means for adjusting said raising means to compensate for differences in the height of said containers.

21. Apparatus for forming objects of baker's material comprising a pivotally mounted container, a pair of rollers arranged in the lower portion of said container to form a chamber therebeneath, one of said rollers being rotatably mounted in the container, the other roller being oscillatably mounted in the container and thereby adapted to swing vertically with the container and to move towards and from said first roller, means for moving said rollers to feed material to said chamber, to isolate said chamber from the remainder of the container, and to express material from said chamber, said chamber having openings in the bottom thereof, and means for moving said openings horizontally for shaping the material, the total movement imparted to the openings having a number of components, and individual cam grooves for controlling each component.

22. Apparatus for forming articles of baker's material comprising an expressing chamber having openings therein, nozzles positioned adjacent said openings, the cross sections of said nozzles being less than the cross sections of said openings, means for expressing material through said openings and nozzles, and means for moving said nozzles to various points within the geometrical limits of said openings during the expressing action.

In testimony whereof I affix my signature.

OTTO KREMMLING.